(12) United States Patent
Turrini

(10) Patent No.: US 8,206,067 B2
(45) Date of Patent: Jun. 26, 2012

(54) CERAMIC DRILL BIT FOR HIGH-SPEED DRILLING OF COMPOSITES

(75) Inventor: Claude Turrini, Ballancourt (FR)

(73) Assignee: SNECMA, Paris (FR)

( * ) Notice: Subject to any disclaimer, the term of this patent is extended or adjusted under 35 U.S.C. 154(b) by 1005 days.

(21) Appl. No.: 12/180,075

(22) Filed: Jul. 25, 2008

(65) Prior Publication Data
US 2009/0028654 A1 Jan. 29, 2009

(30) Foreign Application Priority Data

Jul. 26, 2007 (FR) ...................................... 07 05457

(51) Int. Cl.
*B23B 51/02* (2006.01)
(52) U.S. Cl. .......... 408/1 R; 408/144; 408/211; 408/230
(58) Field of Classification Search .......... 408/211–213, 408/223–225, 227, 229, 230; *B23B 51/02*
See application file for complete search history.

(56) References Cited

U.S. PATENT DOCUMENTS

| 2,230,645 | A | * | 2/1941 | Jones | 408/212 |
| 2,332,295 | A | * | 10/1943 | Bouchal | 408/211 |
| 4,209,275 | A | * | 6/1980 | Kim | 408/211 |
| 4,529,341 | A | | 7/1985 | Greene | |
| 4,645,389 | A | * | 2/1987 | Maier | 408/230 |
| 4,968,193 | A | * | 11/1990 | Chaconas et al. | 408/211 |
| 5,236,291 | A | * | 8/1993 | Agapiou et al. | 408/211 |
| 5,288,183 | A | * | 2/1994 | Chaconas et al. | 408/211 |
| 5,980,166 | A | * | 11/1999 | Ogura | 408/57 |
| 6,071,046 | A | * | 6/2000 | Hecht et al. | 408/225 |
| 6,113,321 | A | * | 9/2000 | Mulroy et al. | 408/211 |
| 6,857,832 | B2 | * | 2/2005 | Nygård | 408/211 |
| 7,367,758 | B2 | | 5/2008 | Turrini et al. | |
| 7,988,389 | B2 | * | 8/2011 | Miebach | 408/211 |
| 2005/0053438 | A1 | * | 3/2005 | Wetzl et al. | 408/225 |
| 2005/0135889 | A1 | * | 6/2005 | Turrini et al. | 408/230 |
| 2009/0087275 | A1 | * | 4/2009 | Goulbourne | 408/230 |
| 2009/0279965 | A1 | * | 11/2009 | Soittu | 408/59 |

FOREIGN PATENT DOCUMENTS

| DE | 101 06 035 A1 | | 8/2002 |
| DE | 10106035 A1 | * | 8/2002 |
| EP | 0 477 093 A1 | | 9/1991 |
| EP | 0 761 352 A1 | | 3/1997 |
| FR | 2 861 001 | | 4/2005 |
| JP | 02237711 A | * | 9/1990 |
| JP | 02237712 A | * | 9/1990 |
| WO | WO 01/91960 A1 | | 12/2001 |
| WO | WO 2004082874 A1 | * | 9/2004 |
| WO | WO 2007/015095 A1 | | 2/2007 |

OTHER PUBLICATIONS

U.S. Appl. No. 12/186,116, filed Aug. 5, 2008, Rouge, et al.

* cited by examiner

*Primary Examiner* — Eric A Gates
(74) *Attorney, Agent, or Firm* — Oblon, Spivak, McClelland, Maier & Neustadt, L.L.P.

(57) ABSTRACT

The ceramic drill bit has a particular geometry and is very advantageously applicable to the very high-speed drilling of parts made of a composite, especially a carbon-fiber composite having an epoxy resin matrix. The invention also relates to a method for the high-speed drilling of composites.

19 Claims, 5 Drawing Sheets

CERAMIC DRILL BIT FOR HIGH-SPEED DRILLING OF COMPOSITES

BACKGROUND OF THE INVENTION

The invention relates to a ceramic drill bit and is particularly applicable to the very high-speed drilling of parts made of a composite, especially a carbon-fiber composite having an epoxy resin matrix. This type of composite, thanks to its high mechanical properties and its low density, is widely used in fields such as the aeronautical field.

DESCRIPTION OF THE PRIOR ART

At the present time, ceramics, owing to their high hardness and their very high temperature resistance, are being developed for the manufacture of cutting tools. Known ceramic cutting tools, such as those described in patent document EP 0 477 093, are generally milling cutter or turning tools and enable high-speed machining operations to be carried out on very hard materials. However, the possible constraints on a drill bit (drilling depth, removal of the chips, intensity and direction of the cutting forces) during a drilling operation are greater than those that may be applied on a milling cutter during a milling cutting operation. These constraints make it more difficult to use ceramic drill bits for carrying out drilling operations at very high speed in very hard materials such as metal superalloys.

Patent FR 2 861 001 offers a solution to this problem by providing a ceramic drill bit having a particular geometry suitable for very high-speed drilling in very hard metallic materials. This geometry makes it possible to overcome problems caused by the lower torsional strength of a ceramic drill bit compared with steel drill bits and to reach peripheral cutting speeds in excess of 400 meters/minute, while still guaranteeing a satisfactory lifetime of the drill bit.

The current trend, especially in aeronautics, is the growing use of composites, this type of material being very advantageous by its having good mechanical properties while having a lower density than metallic materials.

The drilling of composites, and especially of carbon-fiber composites having an epoxy resin matrix, is currently carried out using one-piece tungsten carbide drill bits or drill bits provided with PCD (polycrystalline diamond) inserts on the cutting edge. By using these tools, it is possible to reach peripheral cutting speeds of between 20 and 80 meters/minute, for example in the case of tungsten carbide tools. Above this speed range, the wear of the active part of the tool, consisting of tungsten carbide or PCD, is greatly accelerated. This is because the cutting forces, exerted by these drill bits on the parts to be drilled and the frictional forces between the radially external surfaces of the drill bits and the internal cylindrical surfaces of the drilled holes, induce thermal stresses, both in the drill bits and in the parts to be drilled, and an abrasion phenomenon which together result in accelerated degradation of the drill bits and distortion of the parts.

Furthermore, as the depth of the drillholes increases, the applied torsional forces on the drill bits become more and more significant, not only because the external surface of the drill bit rubbing against the internal cylindrical surface of the drillhole increases, but also because, for high drilling speeds, the drill bit must be capable of removing a large quantity of chips effectively, which may cause jamming in the drill bit, thus increasing the applied torsional forces on the drill bit and the risks of the latter breaking.

Moreover, in the case of a drillhole, the cutting edge of the drill bit must be capable of withstanding a large cutting speed gradient, since the cutting speed is zero at the center of the bit and progressively increases, reaching a maximum on the periphery of the drill bit. This additional constraint contributes to premature wear of the tool and to an increase in the risk of it breaking.

Another constraint on the machining, and in particular the drilling, of composites is that the operation must be carried out while preserving the integrity of the drilled material. During a drilling operation, conventional drill bits exert, on the internal cylindrical surface of the drilled holes, forces that are generally directed from the drill bit toward the material to be machined. This causes the material to undergo delamination, something which it is absolutely necessary to avoid.

Thus, although tools, especially drill bits, the active part of which is made of a ceramic, capable of machining very hard materials at high speed, such as metal superalloys, are commercially available, the known drill bits of the prior art do not allow suitable high-speed machining of composites, particularly carbon-fiber composites having an epoxy resin matrix. For example, the drill bit described in patent FR 2 861 001 is indeed suitable for high-speed drilling of very hard metallic materials, but it is not suitable for composites, causing in this case delamination of the material to be machined.

The object of the invention is to avoid the aforementioned drawbacks and provide a technically simple and inexpensive solution for improving the performance of ceramic drill bits and for drilling composites at very high speed, such as carbon-fiber composites having an epoxy resin matrix, without either delaminating the material or raising the machining temperature to greater than 200° C., above which temperature the mechanical properties of composites drop. Drilling such materials at very high speed, without delaminating them, enables the productivity to be increased while reducing the machining time. To do this, the invention provides a novel type of drill bit capable of reaching a specific cutting energy of between 30 and 50 W/cm$^3$/min, which has an active part made of a ceramic and the geometry of which is optimized and suitable for the high-speed drilling of composites. This novel type of drill bit is capable of withstanding the mechanical forces generated by the material machined at these speeds.

SUMMARY OF THE INVENTION

For this purpose, one subject of the invention is a drill bit comprising a shank, a body in the form of a truncated cone extending as far as the shank and the base of which is located at a free axial end of the drill bit, said end having at least two main cutting edges joined together by two central edges, said body having two lips and two flutes extending in a helical fashion alternately around a longitudinal rotation axis of the drill bit, the lips and the flutes extending from the free axial end to the shank of the drill bit, each lip having a land and each flute having a main cutting face adjacent a land and adjacent a main cutting edge, said main cutting edge forming an intersection with a flank face at the free axial end of the drill bit, the flank faces each being extended, on the side with the lips, by a rake face, two recesses extending from the central edges to the periphery of the drill bit and forming two secondary cutting faces, at least one end portion of the body of the drill bit being made of a ceramic, said drill bit being noteworthy in that each land is radially extended, toward the rotation axis of the drill bit, by a curved bevel, followed by a flank face, such that the intersection between each curved bevel and the adjacent flute is formed by an edge whose radially external end is further away axially, along the rotation axis of the drill bit, from the shank of the drill bit than a radially internal end of said edge, and wherein the curved bevels are each extended, on the side with the rake faces, by a bevel.

Thus, the flank and rake faces of the drill bit head are extended, radially toward the outside, by a first curved bevel forming a flank surface and by a second bevel forming a rake surface, respectively. The inward curvature of the first and second bevels prevents delamination of the composite drilled by the drill bit.

The invention also relates to a method of drilling composites by means of a ceramic drill bit of the type described above, in which method the drill bit has a peripheral cutting speed of between 600 and 1000 m/min.

Advantageously, the drill bit is advanced at between 0.05 and 0.20 mm/revolution.

The drilling may be carried out dry, without a prior centering operation. A single drilling operation may be sufficient to produce the final hole.

The depth of the drillhole may be greater than the diameter of the body of the drill bit.

Preferably, the material to be drilled is a carbon-fiber composite having an epoxy resin matrix.

BRIEF DESCRIPTION OF THE DRAWINGS

The invention will be better understood and other advantages thereof will become more clearly apparent in the light of the description of a preferred embodiment and of variants, given by way of nonlimiting example and with reference to the appended drawings, in which.

DESCRIPTION OF THE PREFERRED EMBODIMENTS

Figure 1:
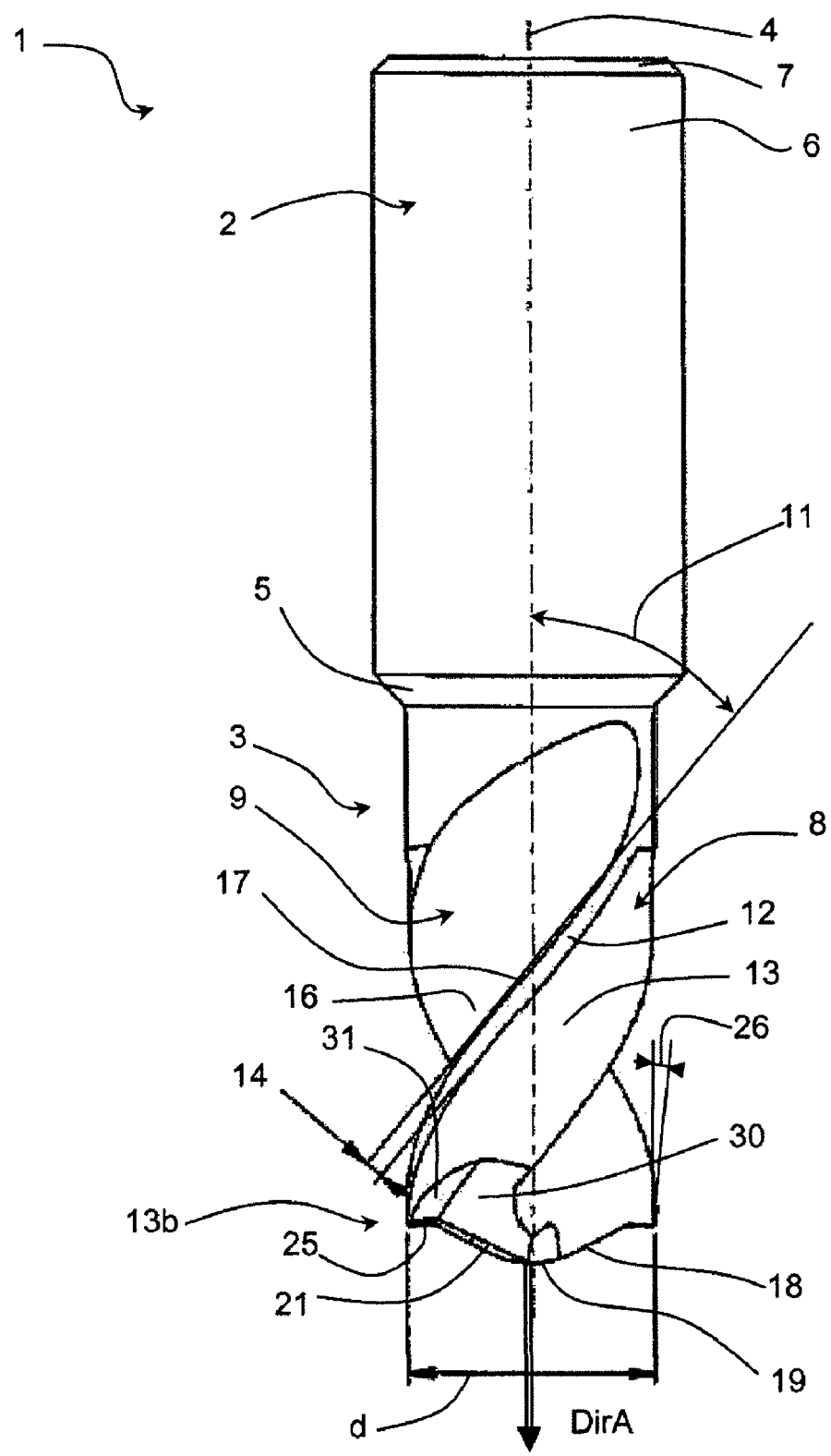
FIG. 1 is a schematic side view of a drill bit according to the invention.

FIGS. 1 to 5 represent by way of example a one-piece drill bit made of a ceramic for the high-speed drilling of composites, in particular carbon-fiber composites having an epoxy resin matrix.

This ceramic drill bit 1 comprises (see FIG. 1) a cylindrical or conical shank 2 and a body 3 extending from the shank along the axis 4 of the drill bit down to a free axial end 13b. The shank may be smooth, as illustrated here, or may have an annular slot (not shown) used for clamping the drill bit in the chuck of a machine tool (not shown). The free axial end 6 of the shank terminates in a bevel 7, making it easier to insert it into the chuck of the machine tool. The shank 2 and the body 3 of the drill bit 1 may be joined together via a bevel 5, this being necessary when the outside diameter of the shank differs from that of the body.

The body 3 of the drill bit 1 includes two lips 8 and two flutes 9 extending alternately around the axis 4 from the shank 2 down to the free axial end 13b of the drill bit 1. The lips 8 and the flutes 9 wind in a helical fashion around the axis 4 with a helix angle 11 of between 25° and 40° approximately.

Each lip 8 has a land 12, intended to slide against the internal wall of a hole to be drilled, and a clearance surface 13. The lands 12 and the clearance surfaces 13 are of helical shape. According to the invention, each land has a thickness 14 equal to or less than one tenth of the diameter d of the body 3 of the drill bit. Each flute 9 has a main cutting face 16 adjacent a land 12. The intersection of the land 12 and the main cutting face 16 forms an edge of the land 12, called the leading edge 17.

At the free axial end 13b of the drill bit 1, each land 12 is radially extended, from the outside of the drill bit 1 toward its axis 4, by a curved bevel 25 followed by a flank face 21. The intersection between each flank face 21 and the corresponding flute 9 forms a main cutting edge 18. The two main cutting edges 18 are extended, in the central part of the drill bit, by two central edges 19. The flank faces 21 are extended, on the side with the lips 8, by a rake face 30.

The rake faces 30 themselves also have a bevel 31 lying in the extension of the curved bevels 25.

The cutting direction and the feed direction of the drill bit are denoted by DirC and DirA respectively.

Let A be the end furthest away from the axis of the drill bit of one of the main cutting edges 18. In order for the geometrical description of the drill bit according to the invention to be as clear as possible, the following planes are defined:

Pr: reference plane of the drill bit 1, corresponding to the plane passing through A, orthogonal to the cutting direction DC and containing the axis 4 of the drill bit 1;

Pf: conventional working plane of the drill bit 1, corresponding to the plane passing through A, corresponding to the reference plane Pr, parallel to the feed direction DA and parallel to the axis of the drill bit 1;

Pp: plane to the rear of the drill bit 1, corresponding to the plane passing through A, orthogonal to the reference plane Pr and to the conventional working plane Pf;

Ps: edge plane of the drill bit 1, corresponding to the plane tangential to the main cutting edge 18 at point A, perpendicular to the reference plane Pr;

Pn: plane normal to the main cutting edge 18, corresponding to the plane perpendicular to the main cutting edge 18 passing through A; and Po: orthogonal plane of the drill bit 1, corresponding to the plane passing through A, perpendicular to the reference plane Pr and to the edge plane Ps.

The geometry of the drill bit according to the invention is such that the orthogonal plane Po of the drill bit is coincident with the normal plane Pn at the main cutting edge 18.

Figure 2:
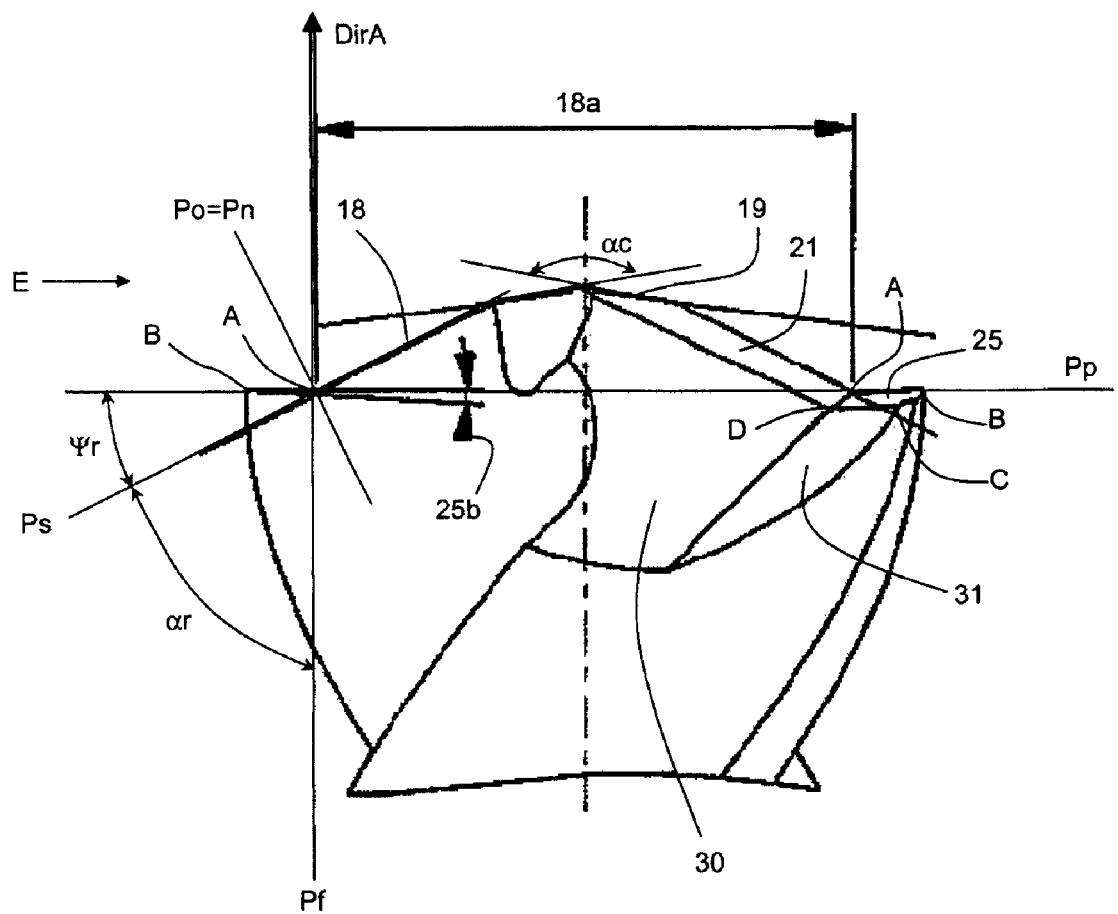
FIG. 2 is a detailed view of the body of the drill bit shown in FIG. 1.

In the reference plane Pr, corresponding to the view in FIG. 2, each edge plane Ps makes, with the work plane Pf, an angle $\alpha r$, called the angle of direction of the main cutting edge 18, of between 55° and 65° approximately. Moreover, each edge plane Ps forms, with the corresponding plane to the rear Pp, an angle $\Psi r$, called the complementary angle of direction of the drill bit 1, of between 27° and 37° approximately. The two central edges 19 make between them an angle $\alpha c$ of between 142° and 162° approximately. In the plane Pr, the edge formed by the intersection between a curved bevel 25 and the corresponding flute 9 is inclined at an angle 25b to the plane Pp, in such a way that point B corresponding to the radially external end of this edge is further away from the shank 3 of the drill bit than point A. The angle 25b is between 3° and 9° approximately. Finally, the distance 18a along the radial direction between the points A on each main cutting edge 18 is between the diameter d of the body 3 less 2 mm and the diameter d plus 2 mm.

Figure 3:
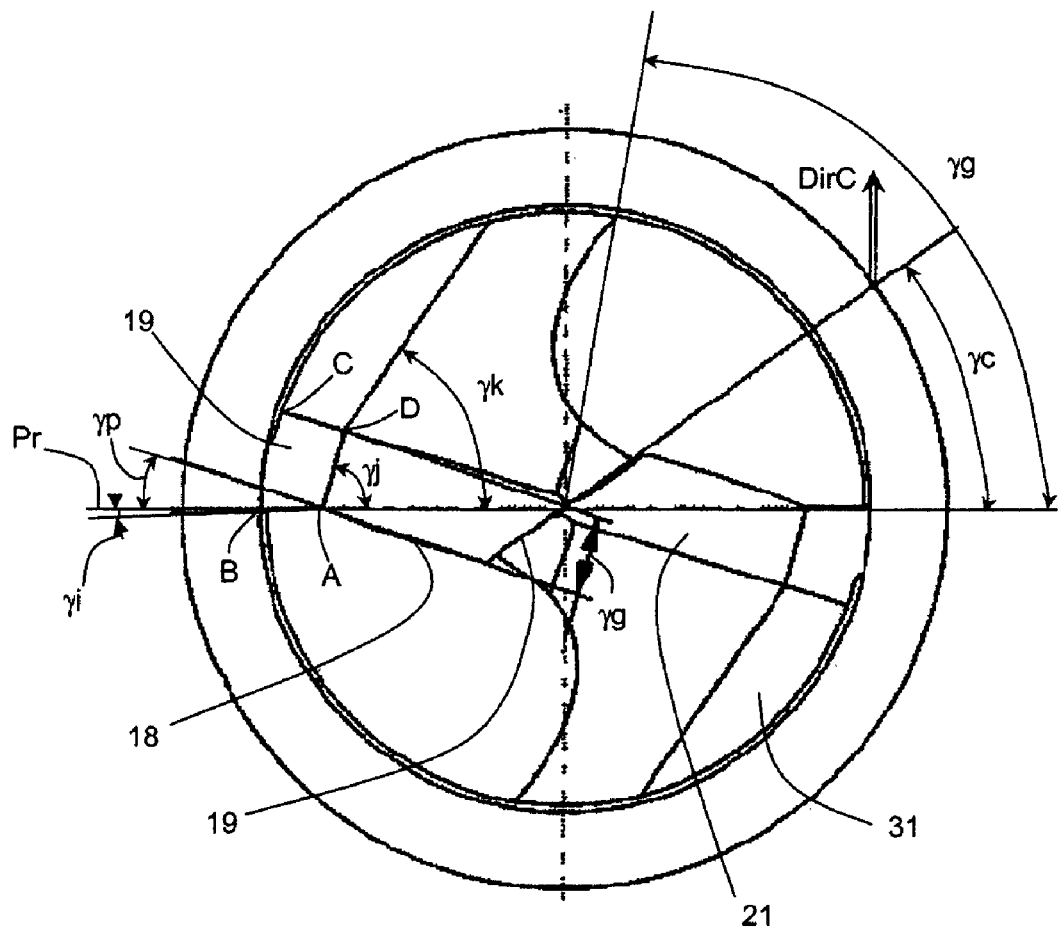
FIG. 3 is a view from below of the drill bit of FIG. 1.

In the plane to the rear Pp of the drill bit 1, corresponding to the view shown in FIG. 3, each main cutting edge 18 makes an angle $\gamma p$ with the reference plane Pr. The angle $\gamma p$ is called the angle of cut to the rear of the drill bit 1 and is between 13° and 23° approximately. In this plane, the flank faces 21 have a width 21b of between 1 and 4 mm approximately. Each central edge 19 makes with the reference plane Pr an angle $\gamma c$ of between 32° and 42° approximately. The intersection between each curved bevel 25 and the bevel 31 produced on the corresponding rake face 30 forms a straight segment, the ends of which are denoted by C and D, C being the end furthest away from the axis 4 of the drill bit. The straight segment AB of a curved bevel 25, B corresponding to the fourth apex of the curved bevel, makes, with the reference plane Pr, an angle γi of between 2° and 4° approximately. The straight segment AD makes an angle γj of between 69° and 79° approximately with the reference plane Pr. Moreover, the intersection between each rake face 30 and the corresponding bevel 31 makes with the reference plane Pr an angle γk of between 50° and 60° approximately. Finally, in the plane Pp, the straight line passing through the axis 4 of the drill bit and through the intersection between a flute 9 and the corresponding clearance surface 13 makes an angle γg of between 60° and 90° approximately with the plane Pr.

Figure 4:
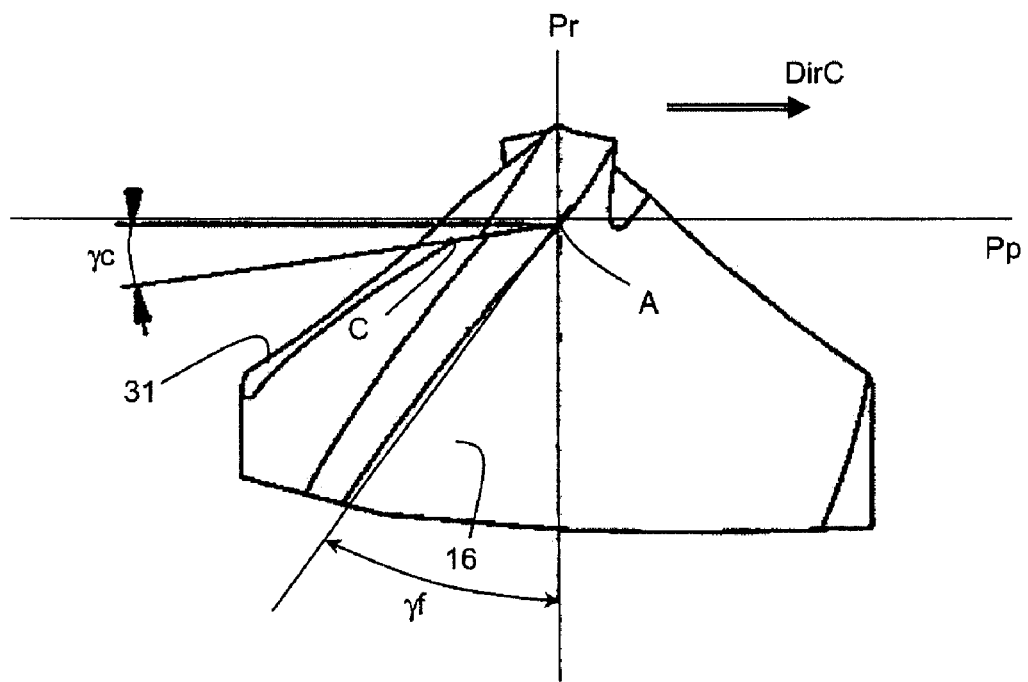
FIG. 4 is a side view of the body of the drill bit according to the invention in the direction E in FIG. 2.
Figure 5:
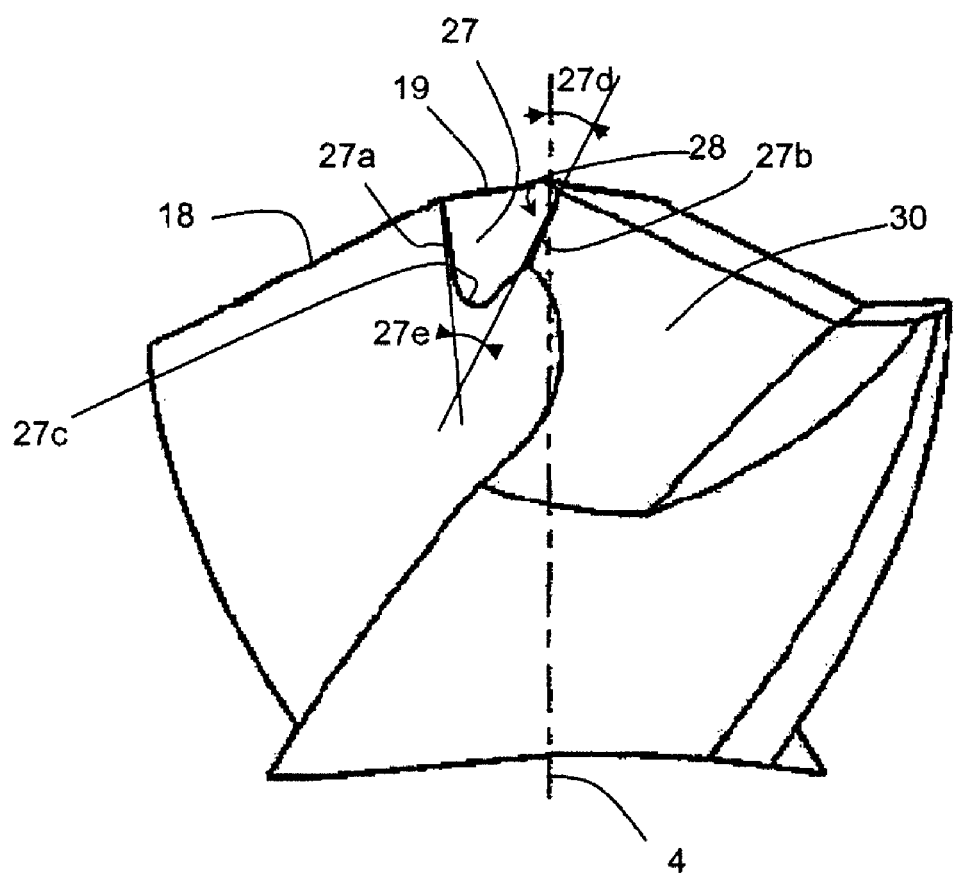
FIG. 5 is a view similar to FIG. 2, illustrating an embodiment detail of the drill bit according to the invention.

In the work plane Pf of the drill bit 1, corresponding to the view in FIG. 4, each main cutting face 16 makes with the reference plane Pr an angle γf, called the lateral angle of cut of the drill bit 1. A positive or negative cut angle is determined by the orientation of the main cutting face 16 relative to the cutting direction DirC: when the cutting face is inclined from the cutting edge toward the cutting direction DirC, the cut angle is said to be negative and, conversely, when the cutting face 16 is inclined from the cutting edge in the opposite direction to the cutting direction DirC, the cut angle γf is said to be positive. According to the invention, the angle of cut γf of the drill bit 1 is positive. In the plane Pf, each curved bevel 25 makes with the plane to the rear Pp of the drill bit 1 and angle γe of between 6° and 10° approximately.

The body 3 of the drill bit has an outer general shape in the form of a truncated cone. The base of the truncated cone is located at the free axial end 13b of the drill bit and the conicity angle 26 of the body 3 may be up to about 3°.

Two secondary cutting faces 28, formed by the construction of two recesses 27 (FIG. 5), extend from the central edges 19 toward the periphery of the drill bit 1. The recesses 27 are bounded by two straight segments, namely a first straight segment 27a starting from the intersection between a main cutting edge 18 and the corresponding central edge 19 and by a second straight segment forming the intersection between the recess 27a and the adjacent rake face 30. The segments 27a and 27b are joined together by a curvilinear part 27c. In the reference plane Pr, the segment 27b makes an angle 27d relative to the axis 4 of the drill bit of between 1° and 15° approximately. In this same plane, the segments 27a and 27b make between them an angle 27e of between 25° and 35° approximately.

The main cutting edges 18 and the leading edge 17 of each land 12 are rounded with a radius of at least 2 microns and possibly up to 5 microns. Preferably, this radius will be around 2 microns approximately.

To manufacture a drill bit according to the invention, it is not essential to know all the geometric characteristics mentioned above. Starting from certain characteristic angles, a person skilled in the art, for example a cutting tool manufacturer, will know how to deduce the other characteristics, in particular using the standardized equations linking the angles together.

The geometry of the drill bit according to the invention makes it possible to reduce the forces directly associated with the cutting, while still preventing delamination. It also makes it possible to reduce the forces resulting from the friction between the lands 12 of the drill bit and the internal wall of the hole to be drilled. Thus, the drill bit according to the invention allows very high-speed drilling of composites, since it withstands the large forces produced under these drilling conditions, while still preventing the drilled material from delaminating. Thanks to this drill bit, it is also conceivable to drill to depths greater than the diameter of the tool, without the latter being worn prematurely. Delamination of the composite is prevented thanks to the presence of the curved bevels 25. This is because, since the radially external ends of the bevels 25 machine the composite before their radially internal ends, the forces applied via the curved bevels on the material to be machined are generally directed toward the axis 4 of the drill bit. Thus, the material is imprisoned by the drill bit, and not pushed away toward the outside, and therefore the various constituent layers of the composite do not undergo a force tending to cause them to separate from one another. Delamination of the material is therefore avoided. The range defined for the helix angle 11 makes it possible to house, on the periphery of the drill bit 1, flutes 9 wide enough to remove the large amount of chips produced during high-speed machining, without reducing the torsional strength of the drill bit. In addition, the presence of flutes 9 with a helix angle lying within this range enables the drill bit according to the invention to produce drillholes having a depth greater than the diameter of the drill bit. Finally, this arrangement, associated with the presence of the angle αc between the central edges 19, enabling the drill bit 1 to be self-centered, allows drillholes to be produced without a preliminary pointing operation being necessary.

As illustrated in FIGS. 1 to 5, the drill bit may be a one-piece drill bit, that is to say the shank 2 and the body 3 are made from the same ceramic and as one piece. The drill bit may also be composed of two parts made of different materials, one for the shank and the other for the active part, that is to say the body. The body of the drill bit may also be composed of two different materials: the part close to the free axial end of the drill bit is then made of a ceramic, while the remaining part may be in the same material as the shank.

The material constituting the active part of the body is preferably a ceramic based on alumina reinforced with silicon carbide (SiC) fibers or based on zirconia or on silicon nitride (called SiAlON) or is a "hybrid" ceramic, whether reinforced or not, a hybrid ceramic being composed of zirconium and silicon nitride.

In the case of a drill bit made in two parts, these two parts may be linked together for example by brazing. The body is then made of a ceramic, while the shank is made in a material of greater toughness than that of the ceramic in order to better withstand the forces applied on the drill bit 1. The material of the drill bit shank may for example be a tungsten carbide.

To illustrate the present invention, an exemplary embodiment was produced, for a part made of carbon-reinforced epoxy resin, with a ceramic drill bit in which the cutting body was made of $Al_2O_3$ and the geometric characteristics of which, excluding the manufacturing tolerances, were the following:

the angle of direction αr of the main cutting edges 18 was 60°;
the complementary angle of direction Ψr of the drill bit 1 was 30°;
the angle αc between the two central edges 19 was 152°;
the angle 25b made by the segment linking points A and B and the plane Pp was 6°;
the distance 18a along the radial direction between the points A of each main cutting edge 18 was 12.7 mm;
the angle of cut to the rear γp was 17.9°;
the width 21b of the flank faces 21 was 2.1 mm;
the angle γc between a central edge 19 and the reference plane Pr was 37.1°;

the angle γj between the straight segment AD and the reference plane Pr was 74°;

the angle γk formed between the intersection of a rake face 30 and of a bevel 31 and the reference plane Pr was 55°;

the angle γg made between, on the one hand, the straight line passing through the axis 4 of the drill bit and the intersection of a flute 9 and the corresponding clearance surface 13 and, on the other hand, passing through the plane Pp, was 80°;

the angle γe between each curved bevel 25 and the plane Pp was 8°;

the γi between each bevel 31 and the plane Pp was 2.1°;

the angle 27d between the segment 27b of the recesses 27 and the axis 4 of the drill bit was 5°;

the angle 27e between the segments 27a and 27b was 30°;

the conicity angle 26 was 1°; and the main cutting edges 18 and the leading edge 17 of each land 12 were rounded with a radius of 2 μm.

The drill bit thus obtained allowed this novel geometry to be tested and the advantages that it provides to be confirmed.

The ceramic drill bit 1 according to the invention is particularly suitable for drilling composites such as carbon-fiber composites having an epoxy resin matrix. Its use requires no particular adaptation, in particular of the machine tool, compared with the use of a drill bit whose active part is made of tungsten carbide. It is only necessary for the machine tool to permit sufficiently high rotation speeds of the tool that are also suitable for high-speed machining. The operating range of the drill bit in terms of cutting speed and feed speed may be determined using an approach of the CTM (Cut Tool Material) type. In the case of composites, the drill bit according to the invention makes it possible to achieve a peripheral cutting speed of between 600 and 1000 m/min, depending on the diameter of the drill bit, for an advance of between 0.05 at 0.20 mm/revolution, without prematurely wearing the drill bit or delaminating the material to be drilled. For these speeds, the drill bit according to the invention allows the stresses exerted on the latter to be considerably reduced, whether these be mechanical stresses (torsional and compressive forces) or thermal stresses. The thermal stresses are reduced by providing heat dissipation via the chips, which rapidly carry off this energy away from the drillhole. The use of the drill bit outside the recommended cutting and feed speed ranges is possible, but does lead to accelerated degradation of the tool and therefore a reduction in its lifetime. The drill bit according to the invention makes it possible, in the case of drilling composites, to reduce the drilling time by a factor of 10. The impact of the geometry of the drill bit on its lifetime is appreciable since the number of holes drilled by the same tool before it is necessary to change it is extended by a factor of 5.

According to another feature of the invention, the drilling is carried out dry, without the use of a lubricant, and constitutes a blank operation requiring no prior pointing operation to center the drill bit.

Depending on the required surface finish and on the required metallurgical characteristics in the immediate periphery of the hole, a single drilling operation, without a prior pointing operation and without a subsequent finishing operation, is sufficient to produce the final hole.

On account of the high cutting and feed speeds that may be achieved thanks to the drill bit according to the invention, only specific machines that are intended for high-speed machining and are sufficiently rigid are capable of giving a completely satisfactory result in terms of drilling quality and lifetime of the tool.

The invention claimed is:

1. A drill bit comprising a shank, a body in the form of a truncated cone extending as far as the shank and the base of which is located at a free axial end of the drill bit, said end having at least two main cutting edges joined together by two central edges, said body having two lips and two flutes extending in a helical fashion alternately around a longitudinal rotation axis of the drill bit, the lips and the flutes extending from the free axial end to the shank of the drill bit, each lip having a land and each flute having a main cutting face adjacent a land and adjacent a main cutting edge, said main cutting edge forming an intersection with a flank face at the free axial end of the drill bit, the flank faces each being extended, on the side with the lips, by a rake face, two recesses extending from the central edges to the periphery of the drill bit and forming two secondary cutting faces, at least one end portion of the body of the drill bit being made of a ceramic, wherein each land is radially extended, toward the rotation axis of the drill bit, by a curved bevel, followed by a flank face, such that the intersection between each curved bevel and the adjacent flute is formed by an edge whose radially external end is further away axially, along the rotation axis of the drill bit, from the shank of the drill bit than a radially internal end of said edge, and wherein the curved bevels are each extended, on the side with the rake faces, by a bevel.

2. A drill bit according to claim 1, wherein the lips and the flutes wind helically around the rotation axis of the drill bit with a helix angle of between 25° and 40° with the rotation axis of the drill bit.

3. A drill bit according to claim 1, wherein a conicity angle of the body is between 1° and 3°.

4. A drill bit according to claim 1, wherein each land has a thickness equal to or less than one tenth of the diameter of the base of the body.

5. A drill bit according to claim 1, wherein each main cutting face is inclined from the adjacent main cutting edge toward a cutting direction of the drill bit.

6. A drill bit according to claim 1, wherein a distance separating, along the radial direction, the radially external ends of the two main cutting edges, is equal, to plus or minus 2 mm, to the diameter of the base of the body.

7. A drill bit according to claim 1, wherein the two central edges make between them an angle of between 142° and 162°.

8. A drill bit according to claim 1, wherein the edge forming the intersection between a curved bevel and the adjacent flute is inclined at an angle of between 3° and 9° to a plane normal to the rotation axis of the drill bit.

9. A drill bit according to claim 1, wherein
   a radially external end of each main cutting edge is called A;
   a reference plane passing through point A, orthogonal to a cutting direction of the drill bit and containing the rotation axis of the drill bit, is called Pr;
   a plane passing through point A, orthogonal to the plane Pr, parallel to a feed direction of the drill bit, and parallel to the rotation axis of the drill bit, is called Pf; and
   a plane passing through point A, orthogonal to the planes Pr and Pf, is called Pp, and
   wherein a plane tangential to the main cutting edge at point A, and perpendicular to the reference plane Pr, makes an angle of between 55° and 65° with the plane Pf.

10. A drill bit according to claim 9, wherein, for each lip, in the plane Pp, a straight line passing through the axis of the drill bit and an intersection between a flute and a corresponding clearance surface makes an angle of between 60° and 90° with the plane Pr.

11. A drill bit according to claim 9, wherein, for each lip, in the plane Pr, each recess is bounded by a first straight segment starting from an intersection between a main cutting edge and the adjacent central edge and by a second straight segment forming an intersection between the recess and the adjacent rake face, the first and second straight segments being joined together by a curvilinear part, the second straight segment being inclined to the rotation axis of the drill bit by an angle of between 1° and 15° and the first and second straight segments making between them an angle of between 25° and 35°.

12. A drill bit according to claim 9, wherein a plane tangential to the main cutting edge at point A, perpendicular to the plane Pr, is called Ps;

a plane passing through point A and perpendicular to the main cutting edge is called Pn; and a plane passing through A, perpendicular to the planes Pr and Ps, is called Po, and wherein the plane Po is coincident with the plane Pn at the main cutting edge.

13. A method of drilling composites comprising:

drilling a hole by means of a ceramic drill bit according to claim 1, wherein the drill bit has a peripheral cutting speed of between 600 and 1000 m/min.

14. A method according to claim 13, wherein the drill bit is advanced at between 0.05 and 0.20 mm/revolution.

15. A method according to claim 13, wherein the drilling is carried out dry.

16. A method according to claim 13, wherein the drilling is carried out without a prior centering operation.

17. A method according to claim 13, wherein a single drilling operation is sufficient to produce the final hole.

18. A method according to claim 13, wherein a depth of the hole is greater than a diameter of the body of the drill bit.

19. A method according to claim 13, wherein the material to be drilled is a carbon-fiber composite having an epoxy resin matrix.

* * * * *